April 20, 1965 G. G. GIBNEY ETAL 3,179,804
ACCELERATOR BEAM ENERGY MONITOR
Filed Jan. 15, 1962 2 Sheets-Sheet 1
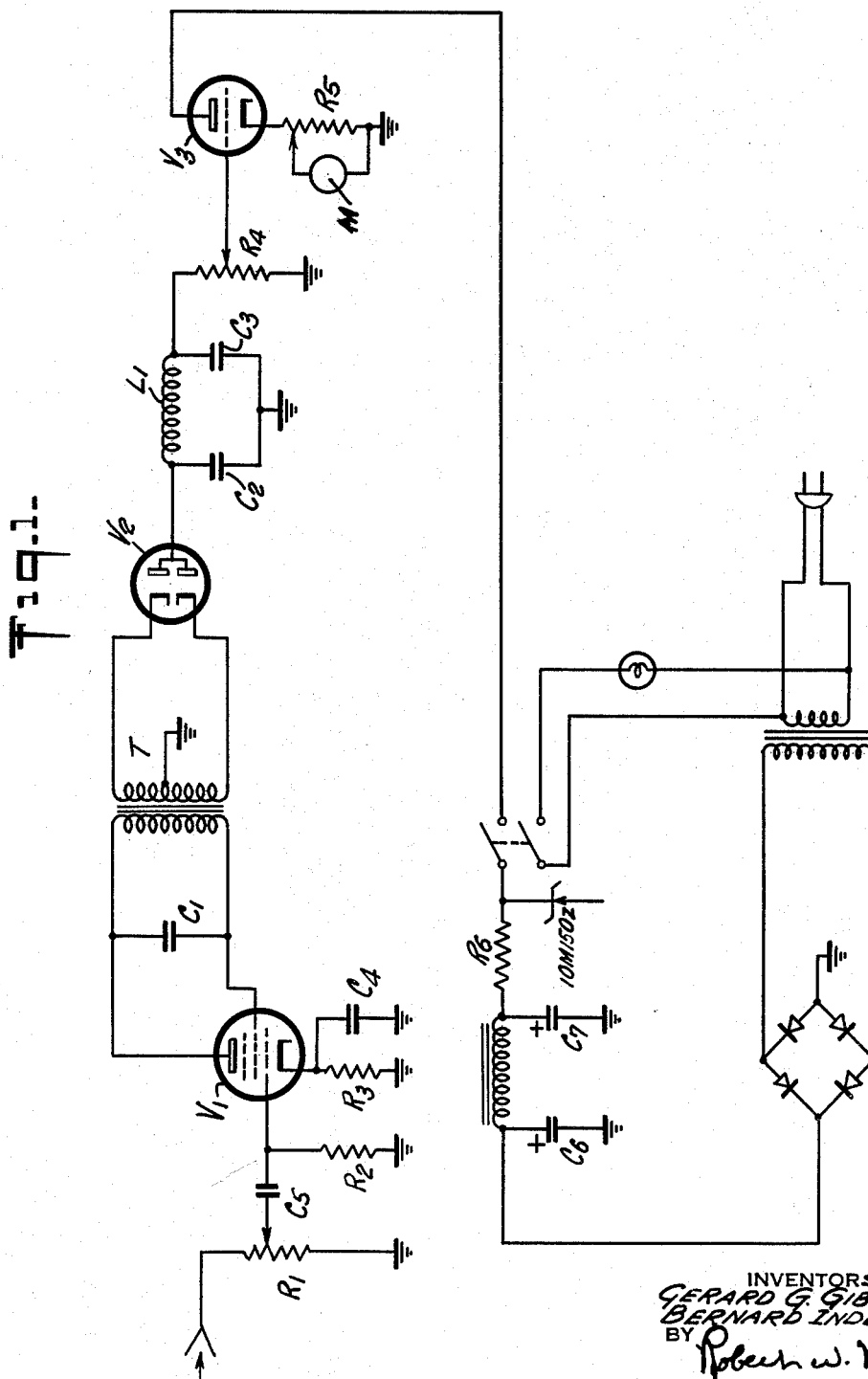
INVENTORS:
GERARD G. GIBNEY
BERNARD INDECK
BY
Robert W. Kell
ATTORNEY April 20, 1965   G. G. GIBNEY ETAL   3,179,804
ACCELERATOR BEAM ENERGY MONITOR
Filed Jan. 15, 1962   2 Sheets-Sheet 2
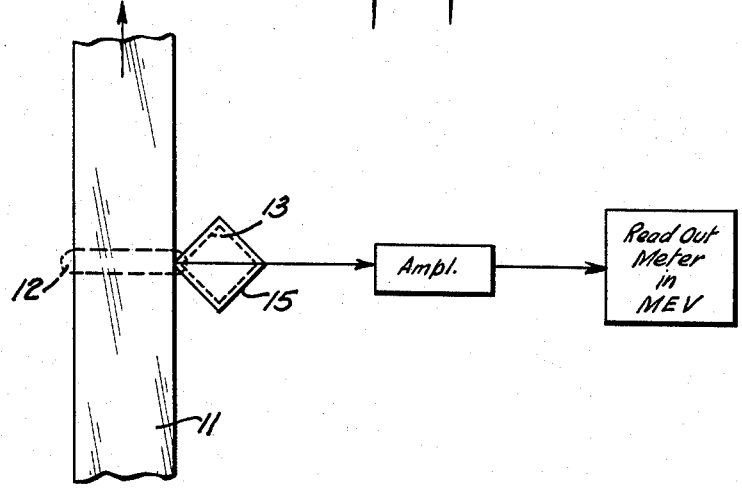
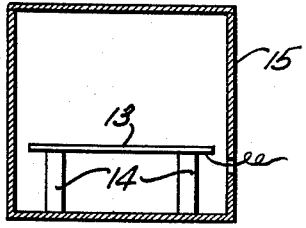
INVENTORS:
GERARD G. GIBNEY
BERNARD INDECK
BY
Robert W. Kell
ATTORNEY

3,179,804
ACCELERATOR BEAM ENERGY MONITOR
Gerard G. Gibney, Raritan, and Bernard Indeck, Somerville, N.J., assignors to Ethicon, Inc., a corporation of New Jersey
Filed Jan. 15, 1962, Ser. No. 166,332
2 Claims. (Cl. 250—83.3)

The present invention relates to a method and apparatus for measuring the energy produced by a particle accelerator such as a linear accelerator.

As early as 1949, it was well established that high energy particles such as electrons, neutrons and protons were capable of killing microorganisms at doses that do not effect many materials. This discovery led to the commercial use of an electron beam in the sterilization of a wide variety of surgical products such as sutures. A suitable electron beam for this purpose may be generated by a Van deGraaff accelerator or a linear accelerator. A linear accelerator is preferred because of its smaller size and comparatively large energy output.

It is highly important to know at all times the energy of the electron beam that is used to irradiate materials of various densities, as the beam energy will normally fluctuate during runs. The sterility of a product that has been irradiated with an electron beam will be dependent upon the density of the product, the energy of the beam and the time of irradiation.

Prior to the present invention, the methods of measuring the electron beam energy of a linear accelerator were cumbersome and time consuming. One such method was to absorb the beam completely in a stack of dosimeter slides. From the readings of the slides in proper order, useful penetration is calculated and converted into electron energy. An energy of 1 mev. implies a penetration of 0.130 inch in unit-density material. Plotting individual readings against thickness produces an ionization-distribution curve.

It is an object of the present invention to provide a continuous energy indicator that will enable one to determine the electron beam energy of a linear accelerator at all times.

The apparatus of the present invention enables the operator to read directly in mev. (millions of electron volts) the energy of the electrons at the time they are produced by the linear accelerator. This is accomplished by measuring the current produced in an insulated metal plate positioned in the electron beam as will be understood upon reference to the following description and accompanying drawings, wherein:

FIGURE 1 is a schematic diagram of an amplifier and rectifier circuit in accordance with this invention.

FIGURE 2 is a plan view showing the position of the insulated metal pickup plate with respect to the electron beam and conveyor belt.

FIGURE 3 is a side elevation of the insulated metal plate and illustrates the method of shielding the same.

Referring now to FIGURE 2, the conveyor belt 11 moves in the direction of the arrow and thus carries the items to be irradiated (not shown) through the scanned electron beam 12. The metal pickup plate 13 is placed as shown so that the path of the scanned electron beam is intercepted by that corner of the plate closest to the conveyor belt.

As illustrated in FIGURE 3, the pickup plate 13 is mounted on insulators 14 within the box 15 which is constructed of metal to shield plate 13 from back scattering electrons produced by the incident beam on the conveyor and the materials on the conveyor. This back scatter may amount to about 20 percent of the energy of the main beam and would cause a false reading if not eliminated. If the box 15 is constructed of aluminum metal 0.85 centimeter in thickness, it will adequately shield the plate 13 from back scattering electrons. The pickup plate 13 is also preferably made of aluminum and may be 0.85 centimeter in thickness.

In operation of a representative linear accelerator, the scanner amplitude, the beam, the scanner frequency and the pulse repetition rate are constant. Therefore, at a given energy output in the operating range, a corresponding current in the form of 800 cycle pulses (klystron pulse frequency) at a repetition rate of 5 cycles (scanner frequency) might be present on the pickup plate. If the energy of the electron beam increases, the scanned beam narrows, and if the energy of the electron beam decreases the scanned beam widens. Therefore, to obtain a decreasing current on the pickup plate with an increasing mev., the pickup plate is installed as shown in FIGURE 2. as the scanned beam narrows with increasing electron energy, the plate area that the beam impinges on decreases faster than the density of electrons per square centimeter increases. The total effect is to lower the pickup plate current with higher electron energy and vice versa. There is one other important effect. As the electron energy increases, the electrons penetrate the pickup plate and less current is produced in the plate and vice versa. In summary, as the energy output of the linear accelerator in mev. increases, the pickup plate current decreases and as the output in mev. decreases, the pickup plate current increases.

The current generated in the pickup plate 13 is fed to the amplifier circuit illustrated by FIGURE 1. The pulsed current is amplified as a voltage by the vacuum tube $V_1$. The audio transformer is tuned to 800 cycles by $C_1$. The amplified voltage is rectified as a negative voltage by $V_2$, a full wave rectifier, filtered by $C_2$, $L_1$, $C_3$ and impressed on the grid of $V_3$ as a negative bias voltage. When the energy of the electron beam increases, the signal to $V_1$ decreases and the negative bias voltage on $V_3$ grid decreases. This causes $V_3$ to conduct more and meter M to read higher. If the energy of the electron beam decreases the signal input to $V_1$ increases, the negative bias on $V_3$ increases, $V_3$ conducts less and meter M reads lower. The meter of the apparatus described above may be calibrated to read the energy of the electron beam directly in millions of electron volts by means of polyvinyl chloride or glass slides by methods known to those versed in this art.

The following circuit constants are suitable for use with a linear accelerator having an energy output in the range of 4.5 to 7.0 mev.

| | | |
|---|---|---|
| $C_1$ | microfarads | 0.005 |
| $C_2$ | do | 20 |
| $C_3$ | do | 20 |
| $C_4$ | do | 100 |
| $C_5$ | do | 0.05 |
| $C_6$ | do | 30 |
| $C_7$ | do | 30 |
| $R_1$ | kilohms | 500 |
| $R_2$ | megohm | 1 |
| $R_3$ | ohms | 150 |
| $R_4$ | kilohms | 500 |
| $R_5$ | do | 5 |
| $R_6$ | ohms | 150 |
| $L_1$ | henrys | 20 |
| $V_1$ | | 6AU6 |
| $V_2$ | | 6AL6 |
| $V_3$ | | 6C4 |

While the invention has been described in detail according to the preferred manner of carrying out the process, it will be obvious to those skilled in the art, after understanding the invention, that changes and modifications may be made therein without departing from the spirit or scope of the invention and it is intended to cover all such changes and modifications in the appended claims.

What is claimed is:

1. Apparatus for continuously measuring the energy of the scanned beam of an electron particle accelerator comprising in combination:
    (a) an insulated and shielded metal plate one corner of which is positioned in the edge of the scanned electron beam so as to intercept a smaller segment of said beam as the energy of the scanned electron beam increases;
    (b) means for amplifying and rectifying the primary current produced in the plate by the absorbed electrons; and
    (c) means to measure the amplified and rectified current.

2. Apparatus for continuously measuring the energy of the scanned beam of an electron particle accelerator comprising in combination:
    (a) an insulated and shielded metal plate one corner of which is positioned in the edge of the scanned electron beam, so that as the scanned beam narrows with increasing electron energy, the plate area that the beam impinges on decreases faster than the density of electrons per square centimeter increases;
    (b) means for amplifying and rectifying the primary current produced in the plate by the absorbed electrons; and
    (c) means to measure the amplified and rectified current.

References Cited by the Examiner
UNITED STATES PATENTS

| | | | |
|---|---|---|---|
| 2,543,039 | 2/51 | McKay | 250—83.3 |
| 2,814,730 | 11/57 | Fechter | 250—49.5 |
| 3,094,615 | 6/63 | Rose | 250—49.5 |

OTHER REFERENCES

The Photographic Action of Electrons in the Range Between 40 and 212 Kilovolts, by Baker et al., from Journal of Applied Physics, vol. 13, No. 7, pages 450–456, July 1942.

RALPH G. NILSON, *Primary Examiner.*

ARCHIE R. BORCHELT, *Examiner.*